United States Patent
Wyman (10) Patent No.: US 10,252,360 B2
(45) Date of Patent: Apr. 9, 2019

(54) METHOD FOR FINISH MACHINING OF A BEVEL GEAR IN A REGION OF A TOOTH HEAD, MACHINE FOR MACHINING BEVEL GEARS, AND GRINDING TOOL FOR USE IN ASSOCIATION THEREWITH

(71) Applicant: Klingelnberg AG, Zurich (CH)

(72) Inventor: Hastings Wyman, Saline, MI (US)

(73) Assignee: KLINGELNBERG AG (CH)

( * ) Notice: Subject to any disclaimer, the term of this patent is extended or adjusted under 35 U.S.C. 154(b) by 16 days.

(21) Appl. No.: 15/211,285

(22) Filed: Jul. 15, 2016

(65) Prior Publication Data
US 2017/0021437 A1   Jan. 26, 2017

(30) Foreign Application Priority Data
Jul. 20, 2015 (EP) .................................... 15177426

(51) Int. Cl.
*B23F 19/12* (2006.01)
*B23F 21/02* (2006.01)
(Continued)

(52) U.S. Cl.
CPC .............. *B23F 19/12* (2013.01); *B23F 5/20* (2013.01); *B23F 9/025* (2013.01); *B23F 21/02* (2013.01);
(Continued)

(58) Field of Classification Search
CPC .... B23F 9/12; B23F 5/20; B23F 9/025; B23F 21/02; B23F 21/03; B23F 23/1225; B24B 49/16; B24B 37/013; B24B 37/042
See application file for complete search history.

(56) References Cited

U.S. PATENT DOCUMENTS 2,539,449 A    1/1951  Mackmann
5,136,522 A *  8/1992  Loehrke .................. B23F 23/12
                                                          451/21
(Continued)

FOREIGN PATENT DOCUMENTS

CN      101829815 A    9/2010
DE      10211129 A1   10/2003
(Continued)

OTHER PUBLICATIONS

Office Action in Chinese Patent Application No. 201610575549.2, dated Jan. 23, 2018, 8 pages.
(Continued)

*Primary Examiner* — Dung Van Nguyen
(74) *Attorney, Agent, or Firm* — McCarter & English, LLP (57) ABSTRACT

Methods for machining may include: (a) providing a bevel gear on a workpiece spindle of a machine, the gear having a tooth having a head, (b) rotationally driving the gear about an axis of the spindle, (c) providing a first machining tool on a tool spindle of the machine, (d) machining the gear by means of the first machining tool, (e) providing a grinding tool as a second machining tool on the tool spindle or on a further spindle, (f) driving the grinding tool to rotate about a tool axis of the tool spindle, wherein the grinding tool comprises a concave machining region that has a ring shape and is arranged concentrically in relation to the tool axis, and (g) advancing the grinding tool in relation to the gear to bring the machining region into chip-removing operational connection with an edge in a region of the head to produce a chamfer on the edge by grinding.

18 Claims, 8 Drawing Sheets

(51) Int. Cl.
   *B23F 5/20* (2006.01)
   *B23F 23/12* (2006.01)
   *B23F 9/02* (2006.01)
(52) U.S. Cl.
   CPC ........ *B23F 21/023* (2013.01); *B23F 23/1225* (2013.01)

(56) References Cited

U.S. PATENT DOCUMENTS

| | | | | |
|---|---|---|---|---|
| 7,927,048 | B2 * | 4/2011 | Gumpl | ............... B23F 5/20 409/2 |
| 2002/0182998 | A1 | 12/2002 | Sicklinger | |
| 2009/0068927 | A1 * | 3/2009 | Durr | ............... B23F 5/02 451/5 |
| 2013/0260643 | A1 * | 10/2013 | Durr | ............... B23F 23/006 451/5 |
| 2016/0089735 | A1 * | 3/2016 | Stadtfeld | ............... B23F 9/025 451/47 |

FOREIGN PATENT DOCUMENTS

| | | |
|---|---|---|
| DE | 10303208 A1 | 12/2004 |
| JP | S58181570 A | 10/1983 |
| JP | H01188224 A | 7/1989 |
| JP | 2005329536 A | 12/2005 |
| JP | 2007030159 A | 2/2007 |
| JP | 2009502521 A | 1/2009 |
| JP | 2013505844 A | 2/2013 |
| JP | 2014514172 A | 6/2014 |
| WO | 0141960 A2 | 6/2001 |

OTHER PUBLICATIONS

Beier H: "Zahnflankenschleifen mit CNC-Profilierten Scheiben", Werkstatt+ Betrieb, Carl Hanser Verlag, Munchen DE, Bd. 132, Nr. 9, 1. Sep. 1999 (Sep. 1, 1999), Seite, 57/58,60, XP000883299, ISSN: 0043-2792.

* cited by examiner

METHOD FOR FINISH MACHINING OF A BEVEL GEAR IN A REGION OF A TOOTH HEAD, MACHINE FOR MACHINING BEVEL GEARS, AND GRINDING TOOL FOR USE IN ASSOCIATION THEREWITH

This application claims priority under 35 U.S.C. §§ 119(a)-(d) to European application no. EP 15 177 426.2 filed Jul. 20, 2015, which is hereby expressly incorporated by reference as part of the present disclosure.

FIELD OF INVENTION

The invention relates to methods for finish machining of a bevel gear in the region of the tooth head or heads and machines which are designed for machining bevel gears in the region of the tooth head or heads. It also relates to a correspondingly designed grinding tool.

BACKGROUND

There are areas of application for bevel gears which require special standards in the matter of geometry, accuracy, etc. While the formation of the head edge of bevel gears only plays a subordinate role in numerous applications, thus, for example, the bevel gear specifications for helicopters require an accurately defined transition between the tooth flanks and the tooth heads.

Thus, for example, these bevel gear specifications require a radius of the head edges in the range between 0.005" (0.127 mm) and 0.015" (0.381 mm). The production of bevel gears in the range mentioned as an example is complex and susceptible to errors.

SUMMARY

Some embodiments, have the following as an object in consideration of the above statements. This is to find an approach which enables the head edges of bevel gears to be manufactured accurately and reproducibly with tolerances which are in the range which is less than 1 mm. In some embodiments, head edges, the tolerance of which may be in the range between 500 µm and 1 µm may be manufactured using embodiments of the invention. In some embodiments, the approach is an approach which enables an access to partially automated or fully automated machining of head flanks of bevel gears.

In accordance with a first aspect, a method for finish machining a bevel gear comprises: (a) providing a bevel gear on a workpiece spindle of a machine tool, the bevel gear having a tooth, the tooth having a tooth head, a tooth flank and a tooth width, (b) rotationally driving the bevel gear about a workpiece axis of rotation of the workpiece spindle, (c) providing a first machining tool on a tool spindle of the machine tool, (d) machining the bevel gear by means of the first machining tool, (e) providing a grinding tool as a second machining tool on the tool spindle or on a further tool spindle of the machine tool, (f) driving the grinding tool to rotate about a tool axis of rotation of the tool spindle, wherein the grinding tool comprises a concave machining region that has a ring shape and is arranged concentrically in relation to the tool axis of rotation, and (g) advancing the grinding tool in relation to the bevel gear in order to bring the concave machining region of the grinding tool into chip-removing operational connection with an edge in a region of the tooth head, wherein the edge extends along the tooth width and defines a transition between the tooth flank and the tooth head, to produce a head chamfer on the edge by machine grinding.

In accordance with a second aspect, a machine for machining bevel gears, the machine comprising: (a) a workpiece spindle which can be driven to rotate about a workpiece axis of rotation, wherein the workpiece spindle is configured to accommodate a bevel gear, (b) at least one tool spindle which can be driven to rotate about a tool axis of rotation, wherein the tool spindle is configured to accommodate a grinding tool, and (c) an NC controller programmed to execute the method of the first aspect set forth above.

In accordance with a third aspect, an apparatus comprises: a grinding tool configured for machine grinding bevel gears in a region of a tooth head, wherein the grinding tool (a) is rotationally-symmetrical in relation to a tool axis of rotation, (b) comprises a machining region, which is arranged concentrically in relation to the tool axis of rotation, is concave in an axial section of the grinding tool, has a ring shape, and which results from two ring-shaped areas which intersect one another in a circle which is concentric to the tool axis of rotation, wherein at least one of the two ring-shaped areas is a working area and is provided with an abrasive material.

Depending on the tolerances with which the head edges are to be produced, the method can be carried out in soft material (i.e., before a temperature treatment of the workpiece) or in the hardened material (i.e., after a temperature treatment of the workpiece).

BRIEF DESCRIPTION OF DRAWINGS

Further details and advantages of embodiments of the invention are described hereafter on the basis of exemplary embodiments and with reference to the drawings.

DETAILED DESCRIPTION OF EMBODIMENTS

Terms are used in conjunction with the present description which are also used in relevant publications and patents. However, it is to be noted that the use of these terms is only to serve for better comprehension. The concept of the invention and the scope of protection of the patent claims are not to be restricted in the interpretation by the specific selection of the terms. The invention may be readily transferred to other term systems and/or technical fields. The terms are to be applied accordingly in other technical fields.

Figure 1:
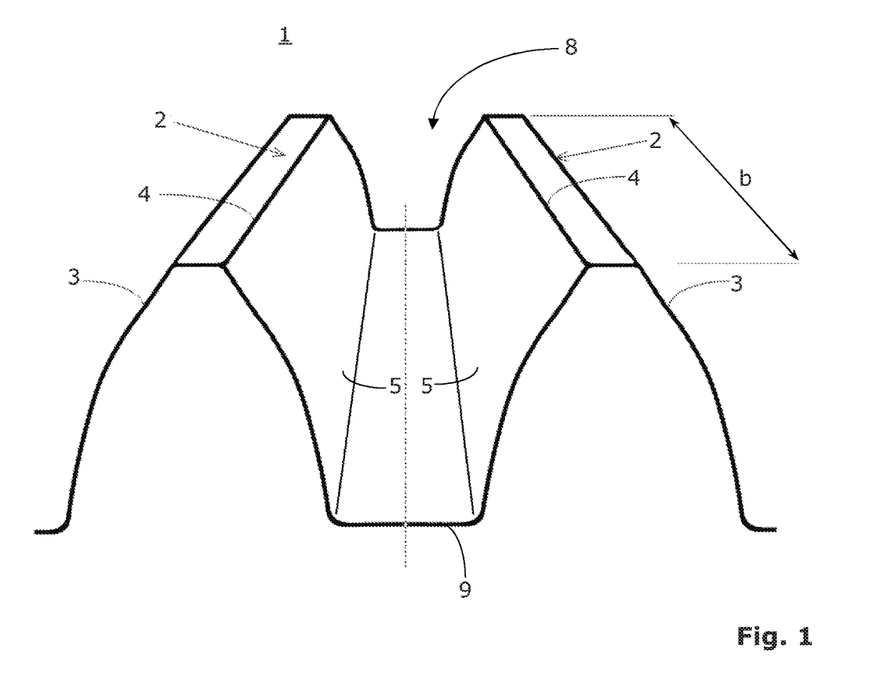
FIG. 1 shows a schematic view of two teeth and a tooth gap of a spiral-toothed bevel gear or hypoid gear.

FIG. 1 shows a schematic illustration of gear teeth of a bevel gear 1, which has a tooth 3 in each case to the right and left of a tooth gap 8. The illustration of FIG. 1 is derived from the ISO23509 standard. In addition, details of the standard DIN 3960 were used. To be able to show the spiral gear teeth in FIG. 1 in the form shown, the spiral gear teeth were decomposed by computer into a very large number of normal sections and these normal sections were laid one after another in the style of transverse sections. The following terms are defined as follows in accordance with the cited standards: tooth head 2, (head) edge 4, tooth flank 5, tooth base 9, tooth width b, tooth head thickness sta (see FIG. 2). The heel of the bevel gear 1 is in front in FIG. 1 and the toe is at the rear (it is therefore not visible in FIG. 1).

Figure 2:
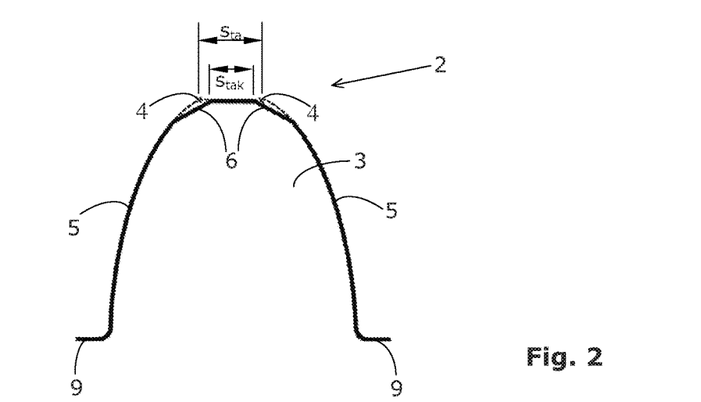
FIG. 2 shows a schematic view of a tooth of a further bevel gear or hypoid gear in normal section, wherein head chamfers are provided on this bevel gear (these head chamfers are shown particularly large for the sake of clarity)

FIG. 2 shows a schematic illustration of a tooth 3 of another bevel gear 1. So-called head chamfers 6 were provided in the region of the head edges 4. The tooth 3 shown has exaggeratedly bulging tooth flanks 5 and overdimensioned head chamfers 6, which is due to better illustration capability. The tooth head thickness sta is reduced due to the working out of these head chamfers 6 on the head edges 4 in the scope of so-called finish machining. The residual tooth head thickness which results is identified here with stak. The passage points of the former head edges 4 through the plane of the drawing are shown in FIG. 2 by two small crosses.

The word "head chamfer" is to be understood as a generic concept for both a head edge break 6.1 and also for a head edge rounding 6.2. A head edge break 6.1 has, viewed in normal section, a linear profile (see FIG. 2). The head edge break 6.1 can also be defined as a secant, which takes away a piece of the material at the head 2 of a tooth 3 (in the region of the head edge 4). A head edge rounding 6.2 has a curved, convex profile viewed in normal section (see, for example, FIG. 3B).

Figure 3A:
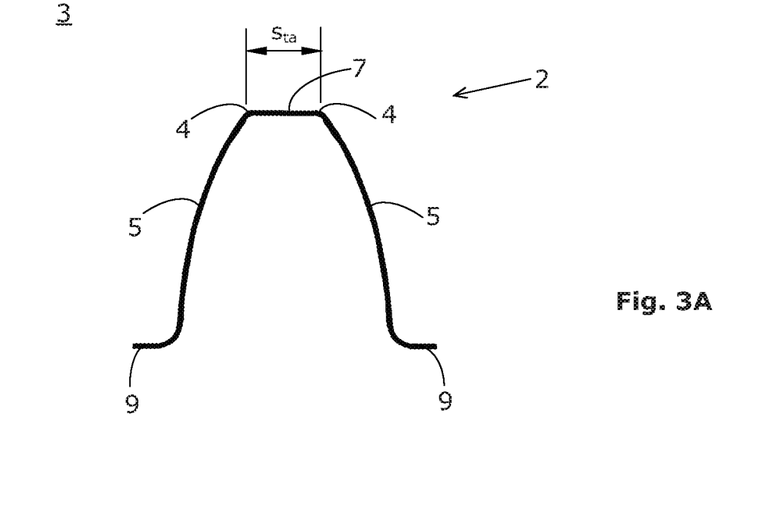
FIG. 3A shows a schematic view of a tooth of a further bevel gear or hypoid gear in normal section, wherein this tooth is shown before the execution of finish machining.

FIG. 3A shows a schematic view of a tooth 3 of a further bevel gear or hypoid gear in normal section, wherein this tooth 3 is shown before the execution of the finish machining. The curved tooth flanks 5 intersect with a head surface 7, which delimits the tooth head 2 on top. The corresponding intersection lines are designated here as head edges 4. The tooth head 2 has a tooth head thickness sta in the snapshot shown.

Figure 3B:
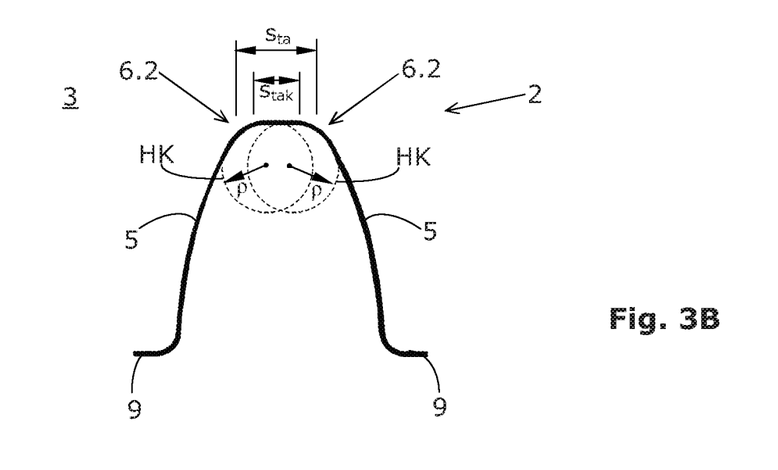
FIG. 3B shows a schematic view of the teeth of FIG. 3A after the execution of finish machining.

Proceeding from the situation shown in FIG. 3A, the finish machining may now be carried out. As a result, the tooth 3 shown in FIG. 3B results. In the example of FIG. 3B, head edge roundings 6.2 were worked out by the cutting removal of material. Two auxiliary circles HK are shown in dashed form, to thus be able to illustrate the radius of curvature ρ of the two head edge roundings 6.2. The residual tooth head thickness stak which results is less than tooth head thickness sta.

Figure 4:
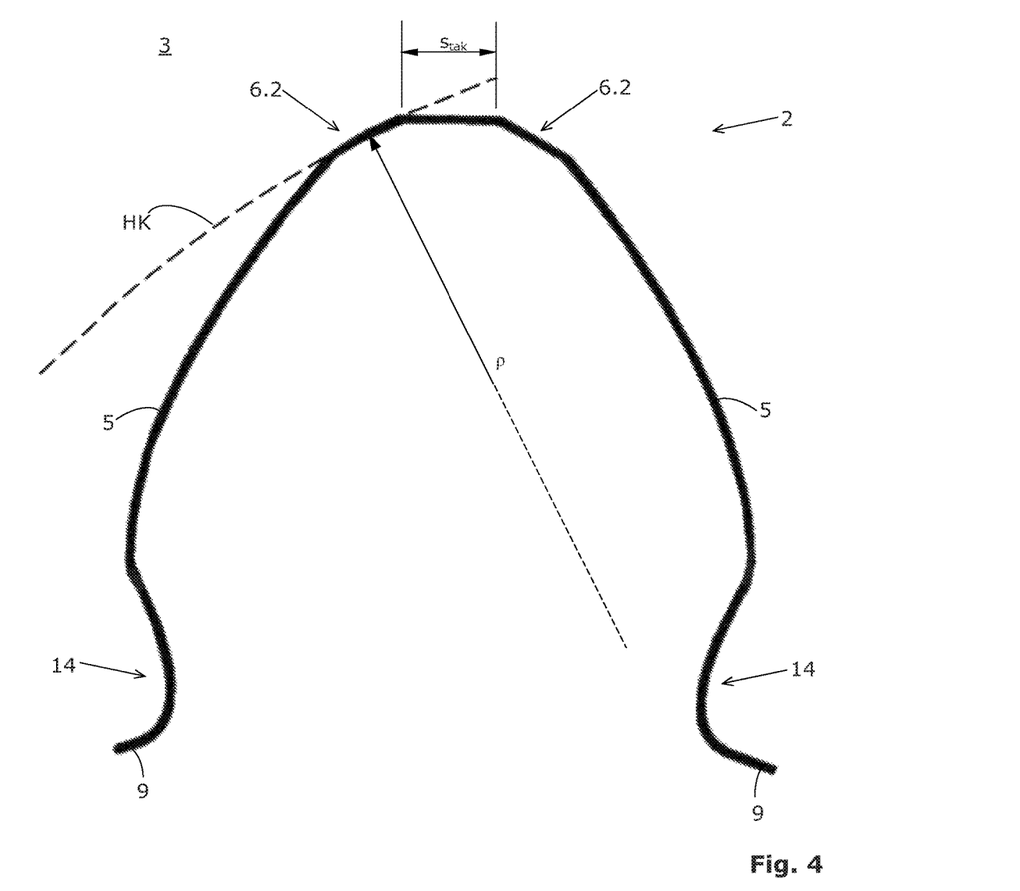
FIG. 4 shows an enlarged, schematic view of a tooth of a further bevel gear pinion in normal section, wherein head chamfers in the form of head edge roundings were provided on this bevel gear (an auxiliary circle is shown for the left head edge roundings)

FIG. 4 shows a greatly enlarged schematic view of a tooth 3 of a further bevel gear 1 (a bevel gear pinion here) in normal section. This tooth 3 also has exaggeratedly bulging tooth flanks 5 and base roundings 14. The two head chamfers 6 have dimensions here which are closer to reality than in the illustrations of FIGS. 2 and 3B. Head chamfers 6 in the form of head edge roundings 6.2 are in turn provided on the bevel gear 1 of FIG. 4. An auxiliary circle arc HK is shown for the left head edge rounding 6.2. The radius of curvature p of the auxiliary circle arc HK is significantly larger here than in FIG. 3B. The center point of the auxiliary circle arc HK of FIG. 4 is located outside the region shown.

Figure 5:
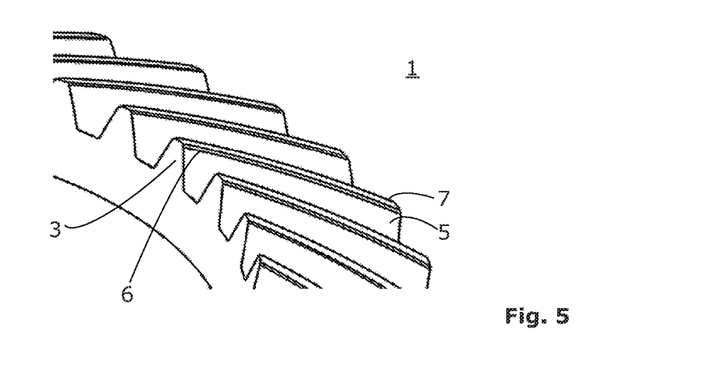
FIG. 5 shows a schematic perspective view of a part of a further bevel gear or hypoid gear, wherein all teeth are provided with head chamfers.

FIG. 5 shows a schematic perspective view of a part of a spiral-toothed bevel gear 1 (right-hand pitch), wherein all teeth 3 are provided with head chamfers 6. The dimensions of the head chamfers 6 are shown approximately in their actual size in FIG. 5.

Figure 6:
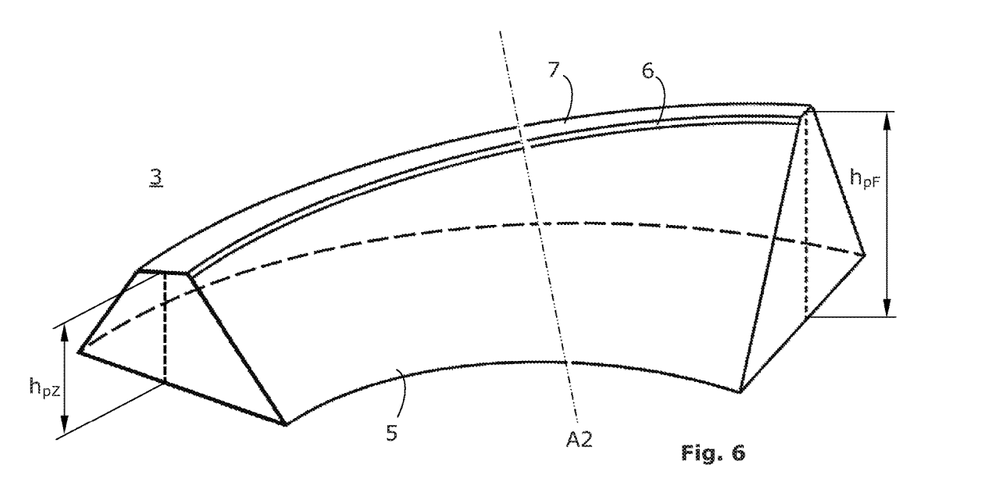
FIG. 6 shows a schematic perspective view of a single tooth of a further bevel gear or hypoid gear, wherein this tooth is provided with a head chamfer on the concave side.

FIG. 6 shows a schematic perspective view of a single tooth 3 of a further spiral-toothed bevel gear 1, wherein this tooth 3 is provided on the concave flank with a head chamfer 6. The dimensions of the head chamfers 6 are shown approximately in their actual size in FIG. 6. The tooth 3 tapers from the heel to the toe. The tooth height hpF at the heel is greater than the tooth height hpZ at the toe. The dimensions of the head chamfers 6 from the heel to the toe remain equal along the tooth width b even in such bevel gears 1, however. In FIG. 6, the tool axis of rotation A2, which lies diagonally in space, is indicated, which is predefined to be able to grind the head chamfers 6 shown using the grinding tool 10. The location of the tool axis of rotation A2 shown is a snapshot.

Figure 7A:
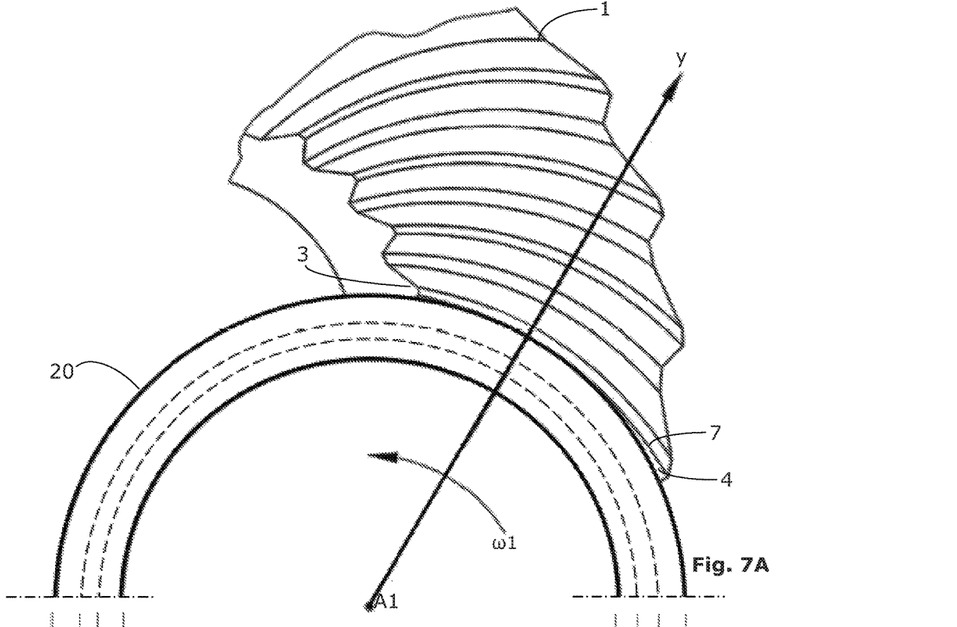
FIG. 7A shows a schematic view of a further bevel gear or hypoid gear in a diagonal top view, wherein, at the moment shown, a conventional grinding tool (shown in radial section) plunges diagonally into one of the tooth gaps, to machine a tooth flank.

FIG. 7A shows a schematic view of a part of a further bevel gear or hypoid gear 1 in a diagonal top view. At the moment shown, a conventional grinding tool 20 is plunging diagonally into one of the tooth gaps of the bevel gear or hypoid gear 1. The grinding tool 20 is shown here in radial section, i.e., the tool axis of rotation A1 is perpendicular to the plane of the drawing. The workpiece axis of rotation B is not shown. It is diagonal to the tool axis of rotation A1 and would protrude diagonally upward to the right out of the plane of the drawing in the image of FIG. 7A.

Figure 7B:
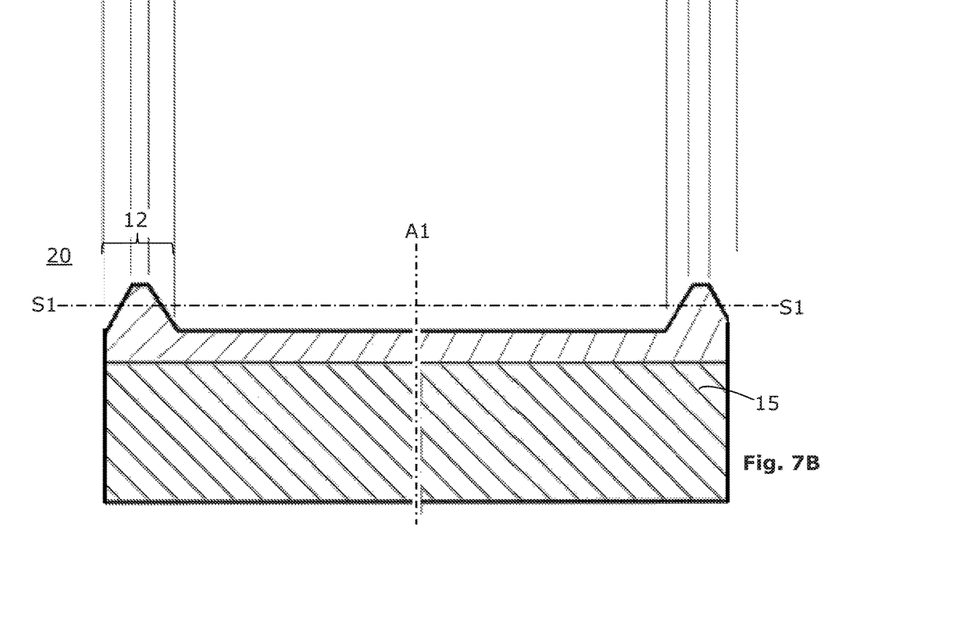
FIG. 7B shows a schematic sectional view of the conventional grinding tool of FIG. 7A (shown in axial section)

The view in FIG. 7A is from the rear side of the conventional grinding tool 20, which is embodied here as a cup grinding wheel. Details of this grinding tool 20 are shown in FIG. 7B in the form of a schematic sectional view in axial section. It can be seen in FIG. 7B that this grinding tool 20 has a cup shape. This cup shape results from a circular circumferential end-face cup edge, which is designated here with the reference sign 12. In the embodiment shown, this cup edge 12 is nearly at the outermost circumference of a base body 15, which is cylindrical or in the form of a truncated cone.

Instead of the plunging, another method for machining the tooth flanks 5 can also be used (for example, a generating method).

In addition to the tool 20, which is used for the (plunging or generating) machining of the tooth flanks 5 (as shown in FIGS. 7A and 7B, for example), a special tool 10 may be used, the details of which are described hereafter on the basis of exemplary embodiments.

The special grinding tool 10 is designed as rotationally-symmetrical in relation to the tool axis of rotation A2. It has a machining region 11, which is concave. This machining region 11 has a ring shape, which results from two ring-shaped areas 13 and 16. These two ring areas are visible in FIGS. 8 and 9 as intersection lines or curves with the plane of the drawing.

The mentioned ring-shaped areas 13 and 16 intersect one another in a circle K1, which is concentric to the tool axis of rotation A2. The passage of this circle K1 through the plane of the drawing is made visible in FIGS. 8 and 9 by small crosses.

In at least some embodiments, at least one of the two ring-shaped areas (the area 13 here) may be used as a so-called working area. At least this area 13 is provided with an abrasive material. This working area 13 is arranged concentrically in relation to the tool axis of rotation A2 in all embodiments.

Details of at least some embodiments will be described on the basis of FIGS. 8 to 11.

At least some embodiments relate to a method for the finish machining of a bevel gear 1 in the region of a tooth head 2 of a tooth 3. At least some embodiments comprise at least the following steps. To be able to execute this finish machining with high accuracy, in at least some embodiments, the bevel gear 1 is not rechucked before the finish machining. That is to say, the bevel gear 1 remains in the same chucking which was also used in the scope of a prior machining (which was performed, for example, using a tool 20, as shown in FIGS. 7A and 7B).

Figure 10:
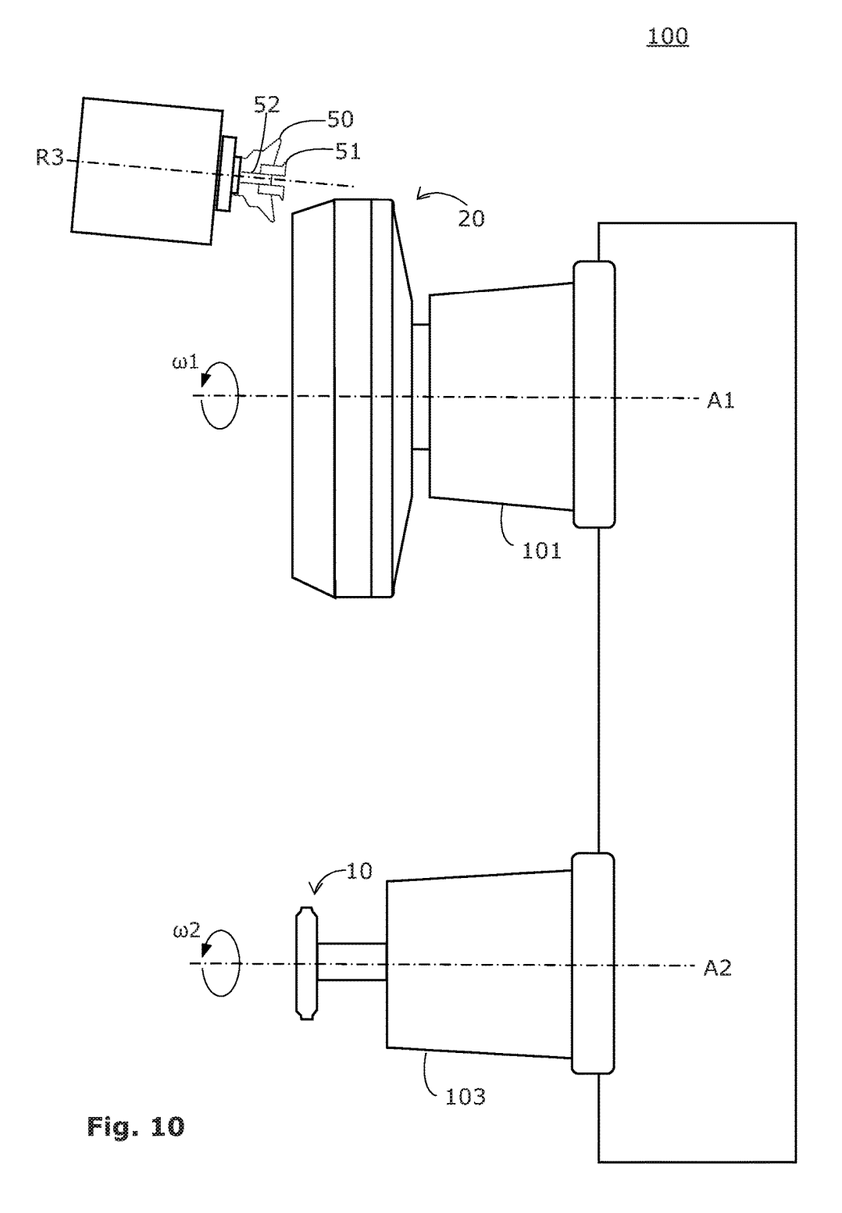
FIG. 10 shows a schematic side view of a part of a two-spindle grinding machine (machine tool) having a conventional grinding tool and having a grinding tool, wherein the grinding machine (optionally) comprises a special dressing disk.
Figure 11:
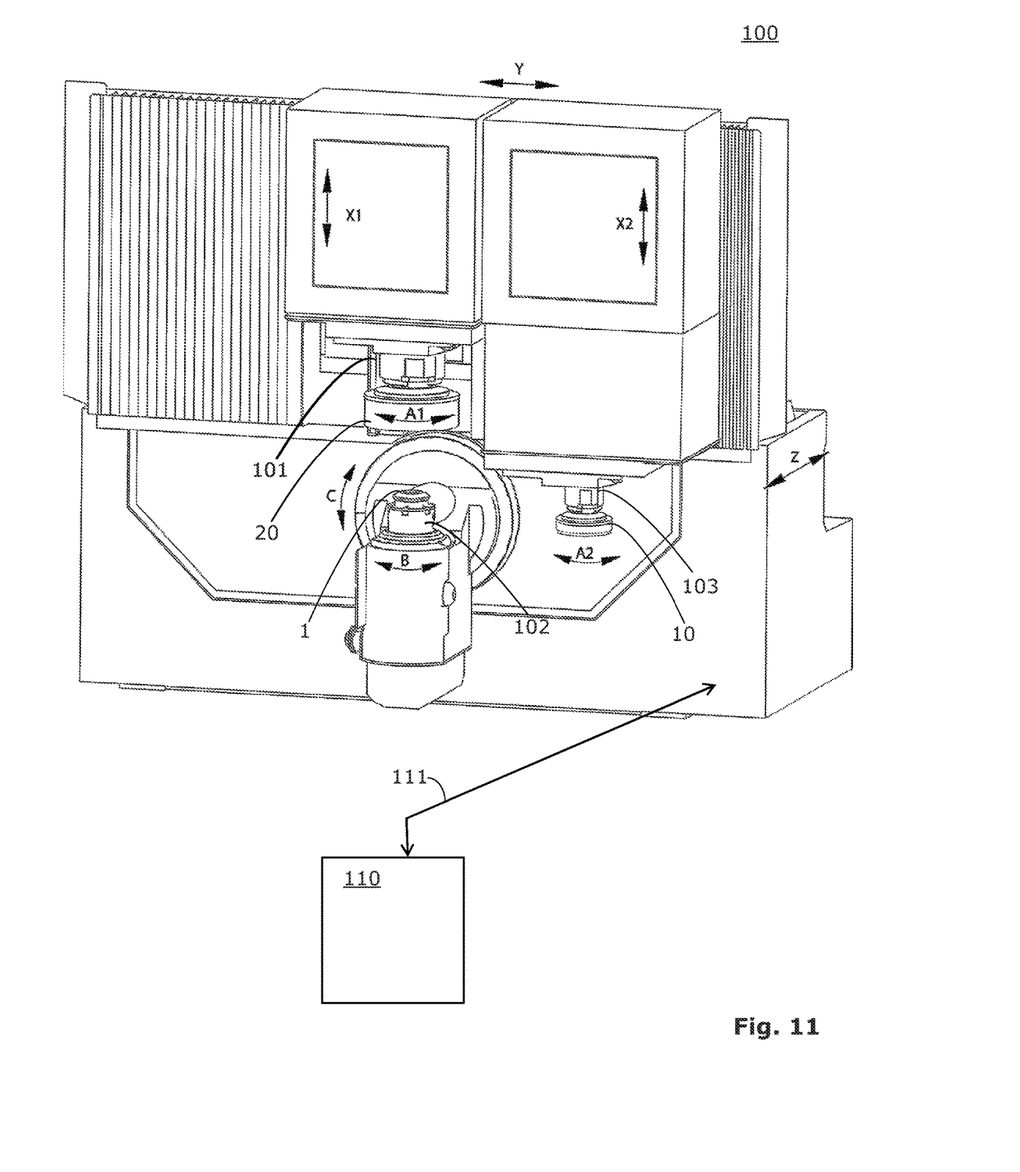
FIG. 11 shows a schematic illustration of a machine tool with axis designations.

At least some embodiments may be carried out in a two-spindle machine 100, as shown in FIGS. 10 and 11 on the basis of two examples. A first (tool) spindle 101 carries the (conventional) tool 20 for machining the flanks 3. A second (tool) spindle 103 carries the special tool 10 for machining the chamfers 6. At least some embodiments can also be carried out, however, in a machine 100 which only comprises one (tool) spindle 101. In this case, before the machining of the chamfers 6, the (conventional) tool 20 may be removed and the special tool 10 may be fastened on the (tool) spindle 101.

A bevel gear 1 may be fastened on a workpiece spindle 102 of a machine tool 100, as shown in FIG. 11 on the basis of an example, before at least some embodiments are carried out. The bevel gear 1 is, in at least some embodiments, a bevel gear 1 which has been (previously) machined using a first machining tool 20, for example, as shown in FIGS. 7A and 7B. To be able to (previously) machine the bevel gear 1 using the first machining tool 20, the first machining tool 20 was provided, for example, on a first tool spindle 101 of the machine 100. The machining (for example, grinding machining) of the bevel gear 1 is then performed by means of the first machining tool 20 in a known manner. The corresponding rotational movement of the tool 20 is designated as the angular velocity ω1 and the corresponding tool axis is designated with A1.

The finish machining in at least some embodiments may now be first performed. In at least some embodiments, the finish machining may be performed directly after the machining using the tool 20, or the finish machining may be performed after further (intermediate) steps have been executed. For the finish machining, in at least some embodi-ments, the grinding tool 10 is provided on the first tool spindle 101 or on a second tool spindle 103 of the machine tool 100.

The bevel gear 1 is then driven to rotate about the workpiece axis of rotation B of the workpiece spindle 102 and the grinding tool 10 is driven to rotate about the tool axis of rotation A1 of the tool spindle 101 or about the tool axis of rotation A2 of the tool spindle 103. The corresponding rotational movement of the tool 10 is designated as the angular velocity ω2.

The grinding tool 10 is advanced in relation to the bevel gear 1 (for example, by executing movements of the X2 and/or Y and/or Z and/or B axes) to bring the concave machining region 11 of the grinding tool 10 into chip-removing operational connection with an edge 4 in the region of the tooth head 2. A chip-removing operational connection is then produced and a head chamfer 6 is produced at this edge 4 of the tooth 3 by grinding machining.

Figure 8:
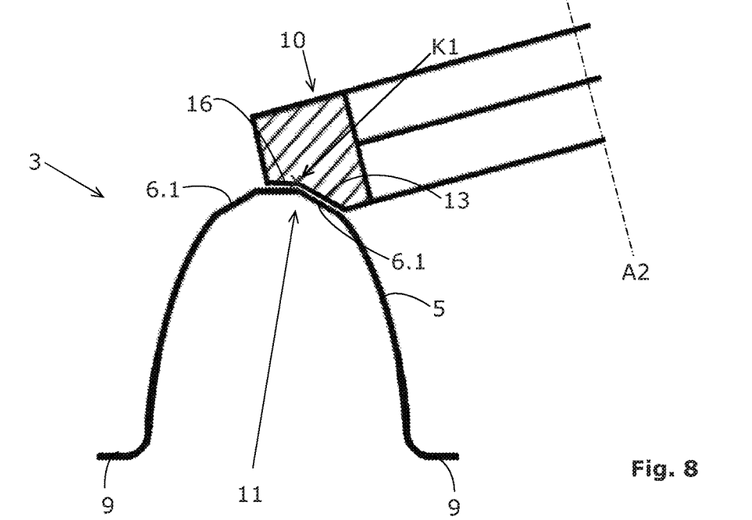
FIG. 8 shows a schematic view of the tooth of FIG. 2 together with an axial section through a grinding tool, wherein the concave ring-shaped region of the grinding tool is machining the head chamfer of the right tooth flank at the moment shown.

The grinding tool 10 is embodied in the exemplary embodiment of FIG. 8 so that the ring-shaped area 16 rests flatly on the head area 7 of the tooth 3 during the grinding machining. This area 16 does not necessarily have to be embodied as abrasive. On the contrary, since the head area 7 was already defined sufficiently accurately in preceding steps, this head area 7 does not have to be subjected to further (finish) machining.

FIG. 8 shows a schematic view of the tooth 3 of FIG. 2 together with an axial section through an exemplary grinding tool 10. The tool axis of rotation A2 is diagonal to the workpiece axis of rotation B (not shown in FIG. 8). At the moment shown, the head chamfer 6.1 of the right tooth flank 5 is presently being machined by the concave ring-shaped region 11 of the grinding tool 10. The head chamfer 6.1 of the left tooth flank 5 was already machined accordingly in a preceding step.

A concave, ring-shaped region 11 is a region of the grinding tool 10 which has a concave shape in axial section of the grinding tool 10. In other words, it is a circumferential constriction or circumferential reduction, which is shown in the axial section of the grinding tool 10. The concave region 11 is to be understood as a negative image of the head chamfer 6 to be produced. That is to say, the concave region 11 is designed so that it presses closely against the head 2 of the tooth 3 during the grinding machining, as can be recognized, for example, on the basis of the example of FIG. 8.

The concave machining region 11 can also be arranged in at least some embodiments, for example, on the external circumference or on the internal circumference of a cup-shaped grinding tool 10. In this case, however, it is to be noted that the basic shape of the tool 10 is to enable collision-free access to the head edges 4 to be ground. The grinding tool 10 of FIG. 8 has a ring shape having a concave machining region 11 on the outer circumference.

Figure 9:
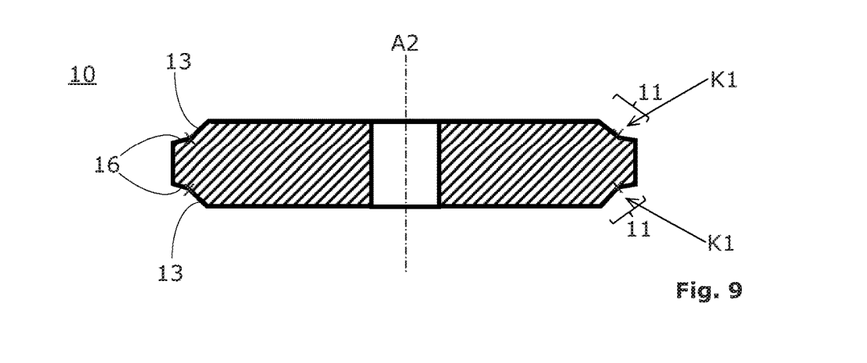
FIG. 9 shows a schematic sectional view of a further grinding tool (shown in axial section), which has a disk shape here.

The grinding tool 10 of FIG. 9 has a disk shape having a concave machining region 11 on the outer circumference. In the grinding tool 10 of FIG. 9, two concave machining regions 11 are provided on the outer circumference. The grinding tool 10 can therefore be turned over if one of the concave machining regions 11 should wear out.

To avoid a collision of the grinding tool 10 with the bevel gear 1, the grinding tool 10 is inclined in all embodiments, as can be recognized, for example, in FIGS. 6 and 8. In at least some embodiments, the grinding tool 10 is smaller than the tool 20 which is typically used in the scope of preceding machining steps. The size difference of the tool 10 from the tool 20 can be recognized in FIG. 10 on the basis of an example. The size of the tool 10 is defined, on the one hand, by the size and shape of the chamfer 6 which is to be machined. On the other hand, the tool 10 has to be able to be advanced without collisions in the direction of the edges 4, so as not to touch the flanks 5 in an uncontrolled manner.

In at least some embodiments, the grinding tool 10 is a grinding tool 10 which can be dressed. That is to say, the grinding tool 10 is provided in at least one region of the ring-shaped working area 13 with an abrasive material, which enables dressing multiple times using a dressing tool 50 (for example, in the form of a dressing roll). The typical dressing tools are not suitable, however, to dress a grinding tool 10. This is because the concave region 11 of the grinding tool 10 has a clearly pronounced cavity. The typical dressers cannot penetrate far enough into such a gravity to dress the ring area 13 therein (and optionally also the ring area 16).

FIG. 10 shows a schematic side view of a part of a grinding machine 100 (referred to in general as a machine tool 100 here), which is designed as a two-spindle machine 100. A first tool spindle 101 is equipped with a grinding tool 20 (in the form of a grinding cup here). A second tool spindle 103 is equipped with a grinding tool 10 (for example, in the form of the grinding tool 10 of FIG. 9 here). The machine tool 100 furthermore comprises a dressing tool 50. This dressing tool 50 is shown in section. In contrast to previous dressing tools, the dressing tool 50 comprises, in at least some embodiments, a dressing insert 51, the convex external contour and dimensions of which are selected so that the dressing insert 51 can dress the concave machining region 11 of the grinding tool 10.

In at least some embodiments, the dressing insert 51 can be inserted into an axial borehole 52 of the dressing tool 50 and fastened therein (as indicated in FIG. 10). The dressing insert 51 can also be an integral component of the dressing tool 50 in all embodiments. However, a dressing tool 50 having suitable convex external contour and dimensions can also be used instead of a dressing insert 51 in all embodiments.

To be able to use the dressing tool 50 for dressing the concave machining region 11, the dressing axis of rotation R3 can be inclined in relation to the grinding tool 20, for example, as indicated in FIG. 10. In the snapshot shown in FIG. 10, the dressing tool 50 is located adjacent to the tool 20, to indicate that it can optionally also be designed for dressing the tool 20.

A further exemplary, CNC-controlled machine tool 100 is shown in FIG. 11. A corresponding CNC controller 110 is shown as a separate module, which is connected to the machine tool 100 via a communication collection 111. This machine tool 100 shown as an example has a first vertical grinding spindle 101 (A1 axis). The grinding tool 20 is fastened on this grinding spindle 101 (a grinding cup is used as the tool 20 here, for example). The machine tool 100 additionally has a second vertical grinding spindle 103 (A2 axis). The special grinding tool 10 is fastened on this grinding spindle 103. A grinding tool 10, which has a cup shape, is shown in FIG. 11, wherein the concave region is indicated. The workpiece (bevel gear 1) to be machined is seated on the B axis and is fastened there on the workpiece spindle 102.

The embodiments of the invention described and claimed here can also be executed on other grinding machines, however. In addition, this machine tool 100 has a pivot axis C, which enables the bevel gear 1 to be pivoted. In addition, there are multiple linear axes X1, X2, Y, and Z, as shown in FIG. 11.

The machine 100 is, in at least some embodiments, designed for machining bevel gears 1 and comprises, in at least some embodiments, a workpiece spindle 102, which can be driven to rotate about the workpiece axis of rotation B. The workpiece spindle 102 is designed to accommodate the bevel gear 1. In addition, the machine 100 comprises, in at least some embodiments, at least one tool spindle 101 (shown in a vertically suspended configuration here), which can be driven to rotate about the tool axis of rotation A1. This tool spindle 101 is designed to accommodate the grinding tool 20 and/or the grinding tool 10. The NC controller 110 of the machine 100 is designed for executing the methods of the invention. A dressing tool 50 is optionally provided for dressing (as shown as an example in FIG. 10), which is rotatable about a dressing axis of rotation R3. The optional dressing tool 50 is not shown in FIG. 11.

As may be recognized by those of ordinary skill in the pertinent art based on the teachings herein, numerous changes and modifications may be made to the above described and other embodiments of the present invention without departing from the spirit of the invention as defined in the claims. Accordingly, this detailed description of embodiments is to be taken in an illustrative, as opposed to a limiting sense.

What is claimed is:

1. A method for finish machining a bevel gear, comprising:
   (a) fastening a bevel gear on a workpiece spindle of a machine tool, the bevel gear having a tooth, the tooth having a tooth head, a tooth flank located to one side of the tooth head and a tooth width,
   (b) rotationally driving the bevel gear about a workpiece axis of rotation of the workpiece spindle,
   (c) machining the bevel gear using a first machining tool located on a tool spindle of the machine tool,
   (d) without removing or rechucking the bevel gear after step (c), driving a grinding tool located on the tool spindle or on a further tool spindle of the machine tool to rotate about a tool axis of rotation of the tool spindle, wherein the grinding tool comprises a concave machining region that has a ring shape and is arranged concentrically in relation to the tool axis of rotation, and
   (e) advancing the grinding tool in relation to the bevel gear in order to bring the concave machining region of the grinding tool into engagement with and chip-removing operational connection with an edge in a region of the tooth head, wherein the edge extends along the tooth width and defines a transition between the tooth flank and the tooth head, to produce a head chamfer on the edge by machine grinding.

2. The method according to claim 1, wherein the bevel gear has a head cone and wherein the edge is a section of the head cone.

3. The method according to claim 1 wherein the head chamfer produced on the edge by machine grinding comprises a head edge break or a head edge rounding.

4. The method according to claim 1 wherein, after producing the head chamfer on the edge by machine grinding, the tooth head has a residual tooth head thickness that is less than a tooth head thickness of the tooth head before the execution of steps (a)-(e).

5. The method according to claim 1 wherein the grinding tool is concave in an axial section of the grinding tool.

6. The method according to claim 1, wherein the step of driving the grinding tool to rotate about the tool axis of rotation includes orienting the tool axis of rotation diagonal to the workpiece axis of rotation.

7. A machine for machining bevel gears, the machine comprising:
 (a) a workpiece spindle which can be driven to rotate about a workpiece axis of rotation, wherein the workpiece spindle is configured to accommodate a bevel gear,
 (b) at least one tool spindle which can be driven to rotate about a tool axis of rotation, wherein the tool spindle is configured to accommodate a grinding tool, and
 (c) an NC controller programmed to execute the following method:
  (A) fastening a bevel gear on the workpiece spindle of the machine, the bevel gear having a tooth, the tooth having a tooth head, a tooth flank located to one side of the tooth head and a tooth width,
  (B) rotationally driving the bevel gear about a workpiece axis of rotation of the workpiece spindle,
  (C) machining the bevel gear using a first machining tool located on a tool spindle of the machine,
  (D) driving a grinding tool located on the tool spindle or on a further tool spindle of the machine to rotate about a tool axis of rotation of the tool spindle, wherein the grinding tool comprises a concave machining region that has a ring shape and is arranged concentrically in relation to the tool axis of rotation, and
  (E) advancing the grinding tool in relation to the bevel gear in order to bring the concave machining region of the grinding tool into engagement with and chip-removing operational connection with an edge in a region of the tooth head, wherein the edge extends along the tooth width and defines a transition between the tooth flank and the tooth head, to produce a head chamfer on the edge by machine grinding.

8. The machine according to claim 7, wherein the machine further comprises a tool spindle in addition to the at least one tool spindle.

9. The machine according to claim 7, wherein the machine further comprises a dressing tool configured for dressing the grinding tool.

10. The machine according to claim 9 wherein the dressing tool comprises a dressing insert configured for dressing the concave machining region of the grinding tool.

11. The machine according to claim 7, wherein the tool axis of rotation is oriented diagonal to the workpiece axis of rotation.

12. The machine according to claim 7, wherein the machine is configured and the NC controller is programmed to execute step (D) without removing or rechucking the bevel gear after step (C).

13. An apparatus comprising:
 a grinding tool configured for machine grinding bevel gears in a region of a tooth head of a tooth thereof, wherein the grinding tool
 (a) is rotationally-symmetrical in relation to a tool axis of rotation,
 (b) comprises a machining region, which
  is arranged concentrically in relation to the tool axis of rotation,
  is concave in an axial section of the grinding tool,
  has a ring shape, and which
 results from two ring-shaped areas which intersect one another in a circle which is concentric to the tool axis of rotation, wherein at least one of the two ring-shaped areas is a working area and is provided with an abrasive material,
 wherein the concave machining region is configured to engage an edge of the tooth defining a transition between the tooth head and a tooth flank located to one side of the tooth head.

14. The apparatus according to claim 13, wherein the grinding tool has a cup shape, and wherein the machining region is arranged on an outer side or on an inner side.

15. The apparatus according to claim 13, wherein the grinding tool has a disk shape.

16. The apparatus according to claim 13, wherein the grinding tool has a ring shape.

17. The apparatus according to claim 13, wherein the working area has a linear profile or a concave profile in the axial section of the grinding tool.

18. The apparatus according to claim 13, wherein the tool axis of rotation is oriented diagonal to a workpiece axis of rotation for the bevel gear during said machine grinding.

* * * * *